(12) United States Patent
Kanayama

(10) Patent No.: US 7,652,711 B2
(45) Date of Patent: Jan. 26, 2010

(54) LENS CONTROL SYSTEM, LENS CONTROLLER, AND OPERATING APPARATUS

(75) Inventor: Atsushi Kanayama, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 667 days.

(21) Appl. No.: 11/093,302

(22) Filed: Mar. 30, 2005

(65) Prior Publication Data

US 2006/0221224 A1 Oct. 5, 2006

(30) Foreign Application Priority Data

Mar. 31, 2004 (JP) .................... P. 2004-107178

(51) Int. Cl.
*G02B 13/16* (2006.01)
*H04N 5/225* (2006.01)

(52) U.S. Cl. .................... 348/335; 348/240.3; 348/357; 396/135

(58) Field of Classification Search ................. 348/335; 396/135
See application file for complete search history.

(56) References Cited

U.S. PATENT DOCUMENTS

| | | | | |
|---|---|---|---|---|
| 4,878,077 A | * | 10/1989 | Maeno et al. | 396/135 |
| 5,159,370 A | | 10/1992 | Takahashi | |
| 6,134,390 A | * | 10/2000 | Kasuya | 396/77 |
| 6,370,332 B1 | * | 4/2002 | Kubo | 396/77 |
| 6,822,686 B1 | * | 11/2004 | Kubo et al. | 348/347 |
| 6,897,896 B1 | * | 5/2005 | Mizumura | 348/240.3 |
| 6,963,366 B2 | * | 11/2005 | Okawara | 348/240.99 |
| 7,576,796 B2 | * | 8/2009 | Kanayama | 348/350 |
| 2001/0048479 A1 | * | 12/2001 | Ohkawara et al. | 348/360 |

FOREIGN PATENT DOCUMENTS

| | | |
|---|---|---|
| EP | 0 887 677 A2 | 12/1998 |
| EP | 1 067 781 A1 | 1/2001 |
| JP | 62-73302 (A) | 4/1987 |
| JP | 62073302 A * | 4/1987 |
| JP | 3-98484 (A) | 4/1991 |
| JP | 08262305 A * | 10/1996 |
| JP | 2810437 B2 | 7/1998 |

OTHER PUBLICATIONS

European Search Report issued on Jul. 25, 2005.

* cited by examiner

*Primary Examiner*—Jason Chan
*Assistant Examiner*—Cynthia Calderon
(74) *Attorney, Agent, or Firm*—Harness, Dickey & Pierce, P.L.C.

(57) ABSTRACT

In relation to a lens control system where a control signal indicating a target zooming speed is delivered to a lens controller in accordance with operation of a zoom demand and where the lens controller subjects the control signal to non-linear processing to thus effect zoom control, thereby facilitating operation required when a zoom lens is moved at low speed, the lens control system includes a lens controller switching the linear processing between valid and invalid, whereby the lens control system does not excessively perform non-linear processing when the zoom demand outputs a non-linear control signal.

11 Claims, 11 Drawing Sheets

LENS CONTROL SYSTEM, LENS CONTROLLER, AND OPERATING APPARATUS

FIELD OF THE INVENTION

The present invention relates to a lens control system, a lens controller, and an operating apparatus, and more particularly, to a lens control system which controls a lens in accordance with a control signal output from a controller for speed control purpose or the like, as well as to a lens controller and an operating apparatus.

BACKGROUND OF THE INVENTION

The speed of zooming operation of a taking lens used in a television camera for broadcasting purpose is usually controlled with use of a controller for speed control purpose. For instance, a rotatable thumb ring is provided on a controller (an operating apparatus) for speed control purpose called a zoom demand. During a non-operating state in which the thumb ring is not operated, the taking lens automatically returns to a reference position. When the thumb ring is rotatably operated from that reference position, the taking lens is zoomed in accordance with the speed corresponding to the amount of rotational operation. In order to facilitate operation required to effect zooming operation at a low speed during such a zooming speed control operation, there is employed a technique for changing the zooming speed in a non-linear manner in response to the amount of operation of the operating section, such as the thumb ring (see, e.g., Japanese Patent No. 2,810,437).

There are many cases where a controller equipped with an operating section, such as a thumb ring, and a lens controller for effecting lens control, such as zoom control operation, in response to a control signal output from a controller in accordance with operation of the operating section are commercialized in the form of separate apparatus. Many lens controllers are integrated with a taking lens (an optical system) Currently, there mixedly exist a controller (generally used for controlling a high-grade lens) which has a non-linear characteristic and outputs a control signal whose value changes in a non-linear manner with respect to the amount of operation of the operating section set forth; and a controller which has a linear characteristic and outputs a control signal (a linear control signal) whose value changes linearly with respect to the amount of operation.

Meanwhile, the lens controller is also in the same circumstance as that of the controller. There mixedly exist a lens controller which has a non-linear characteristic and performs non-linear control operation by converting the control signal output from the controller into a non-linear control signal; and a lens controller which has a linear characteristic and performs linear control operation by using the control signal output from the controller while maintaining the characteristics of the control signal unchanged.

Therefore, there may be a case where the lens controller and the controller each have non-linear characteristics, depending on a combination thereof. In this case, there arises a problem of the non-linear effect becoming excessive, which in turn deteriorates operability.

There may also be a case where a television camera is mounted on a pan head of a pan-head system and where the zooming position, or the like, of a taking lens of the television camera is controlled through use of a controller of the pan-head system. In such a case, if a lens controller having a non-linear characteristic is incorporated in the system and there is performed processing for converting the control signal given to the lens controller into a non-linear control signal, there may arise a problem in positional accuracy or operability.

SUMMARY OF THE INVENTION

The present invention has been conceived in view of the circumstances, and an object of the present invention is to provide a lens control system that enables optimum lens control regardless of the nature of a system or the type of a controller, as well as to provide a lens controller and an operating apparatus.

To achieve the object, a lens control system includes: an operating apparatus for outputting a control signal that shows (or indicates) a target moving speed or target position of a movable lens group in a taking lens on the basis of operation of an operating section; and a lens controller that controls the moving speed of the movable lens group on the basis of the control signal and includes non-linear processing means for performing a non-linear processing of the control signal received from the operating apparatus, wherein the lens controller further includes invalidation means for invalidating the non-linear processing performed by the non-linear processing means. The invalidation means is a determination means for determining whether to activate the non-linear processing means. According to the present invention, when the operating apparatus outputs a non-linear control signal, the non-linear processing of the lens controller is invalidated (i.e., the determination means determine to deactivate the non-linear processing means. In other word, the determination means determines that the non-linear processing means does not perform the non-linear processing of the control signal), thereby preventing excessive non-linear processing. As a result, deterioration of operability can be prevented.

The lens control system may further include a switch for selecting whether the non-linear processing means activates or deactivates the non-linear processing (i.e., the switch is used for selecting on/off of the non-linear processing), wherein the invalidation means invalidates the non-linear processing when deactivation of the non-linear processing is selected by means of the switch. By means of the switch, the user selects whether or not the non-linear processing of the lens controller is to be invalidated.

In the lens control system, when a control signal output by the operating apparatus is a non-linear control signal with respect to response to operation of the operating section, the invalidation means can invalidate the non-linear processing. According to the present invention, non-linear processing of the lens controller is automatically invalidated when the control signal output from the operating apparatus is a non-linear control signal.

In the lens control system, when the control signal given by the operating apparatus is a control signal for a case where the movable lens group is moved to a position specified by means of operation of the operating section (i.e., the control signal indicates the target position of the movable lens group), the invalidation means can invalidate the non-linear processing. According to the present invention, in the system which controls the position of the lens group, deterioration of positional accuracy or operability can be prevented by invalidating non-linear processing performed by the lens controller.

To achieve the object, another lens control system includes: an operating apparatus for outputting a control signal which shows a target moving speed or target position of a movable lens group in a taking lens on the basis of operation of an operating section; and a lens controller that controls the moving speed of the movable lens group on the basis of the control signal given by the operating apparatus, wherein the operating apparatus includes control signal output means for selecting a linear control signal or a non-linear control signal in response to operation of the operating section and outputting the selected linear or non-linear control signal. According to the present invention, the control signal output from the operating apparatus can be switched between a linear control signal and a non-linear control signal. Hence, excessive non-linear processing can be prevented.

The lens control system may further include a switch for selecting the linear control signal or the non-linear control signal, wherein the control signal output means outputs the linear control signal or the non-linear control signal on the basis of selection of the switch. Through use of the switch, the user can select whether the control signal output from the operating apparatus is linear or non-linear.

In the lens control system, the control signal output means can output the linear control signal when the lens controller performs a non-linear processing of the control signal given by the operating apparatus. According to the present invention, when the lens controller performs a non-linear processing, a linear control signal can be automatically selected for the output from the operating apparatus.

A lens controller of the present invention includes at least one of: an invalidation means for invalidating a non-linear processing of a control signal, the control signal indicating a target moving speed or target position of a movable lens group in a taking lens on the basis of operation of an operating section in an operating apparatus; a switch for selecting whether the non-linear processing is activated or deactivated; means for outputting to the operating apparatus a signal indicating that the lens controller performs the non-linear processing; and a switch for selecting whether the control signal is a linear control signal or a non-linear control signal.

An operating apparatus of present invention includes at least one of: a switch for selecting whether the non-linear processing is activated or deactivated; means for outputting to a lens controller a signal indicating that a control signal output by the operating apparatus is a non-linear control signal, the control signal indicating a target moving speed or target position of the movable lens in a taking lens with respect to response to operation of an operating section; means for outputting to the lens controller a signal indicating that the control signal output by the operating apparatus is a control signal used when the movable lens group is moved to a position specified by means of operation of the operating section; signal output means for selecting a linear control signal or a non-linear control signal in response to operation of the operating section and outputting the linear control signal or the non-linear control signal; and a switch for selecting whether the control signal is the linear control signal or the non-linear control signal.

According to a lens control system, a lens controller, and an operating apparatus of the present invention, the lens controller and the operating apparatus, such as a controller, can be prevented from performing excessive non-linear processing. Therefore, optimum lens control can be performed regardless of the nature of a system or the type of a controller.

DETAILED DESCRIPTION OF THE INVENTION

A preferred embodiment of a lens control system, a lens controller, and an operating system according to the present invention will be described in detail hereinbelow by reference to the accompanying drawings.

Figure 1:
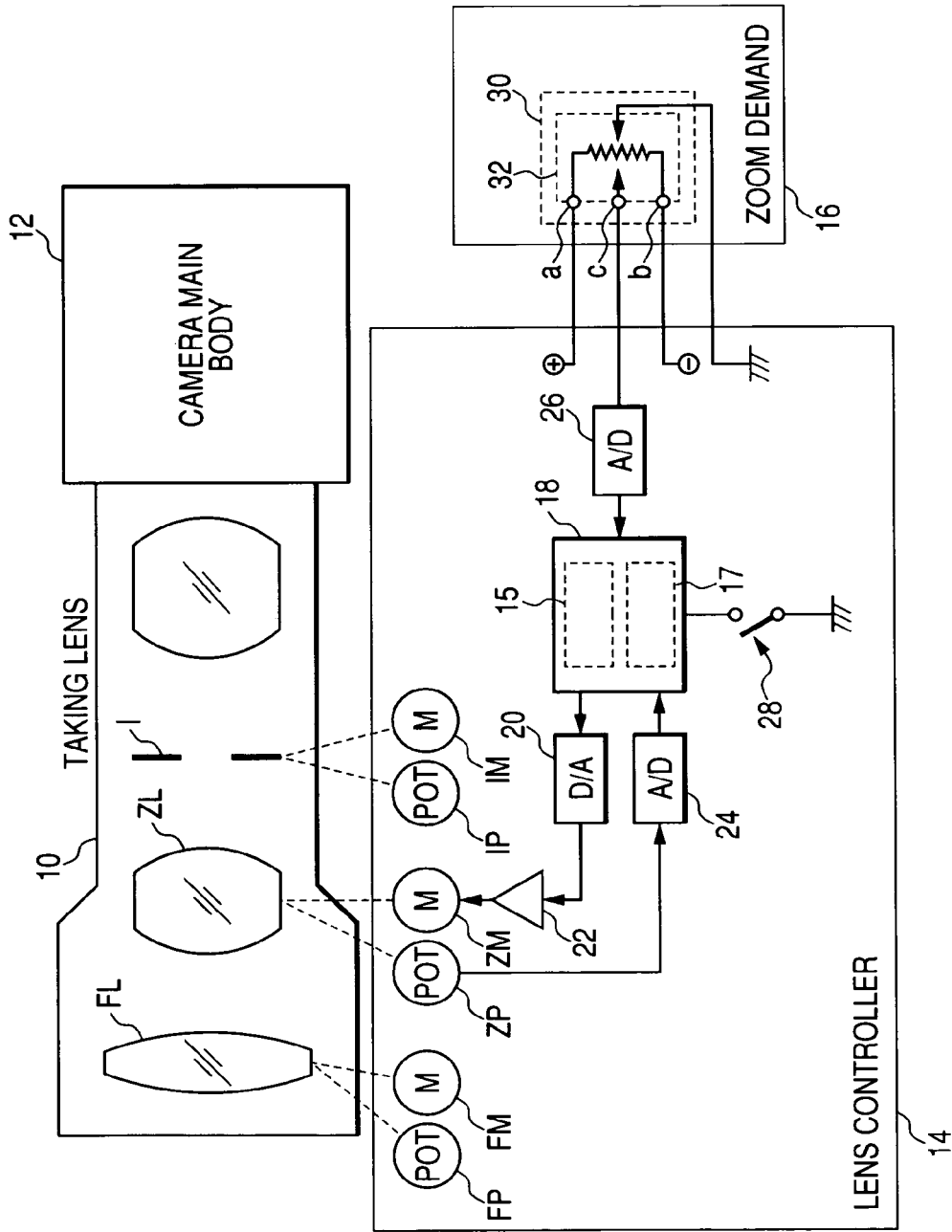
FIG. 1 is a block diagram showing a first embodiment of a configuration pertaining to zoom control of a lens control system to which the present invention is applied.

FIG. 1 is a block diagram showing a first embodiment having a configuration pertaining to zoom control operation of a lens control system to which the present invention is applied. As illustrated, the lens control system comprises a taking lens 10 secured on a camera main body 12 of a broadcast television camera by means of a mount; a lens controller 14 for controlling the taking lens 10; and as an a zoom demand 16 connected to the lens controller 14 by means of a cable or the like.

For instance, in addition to various types of fixed lenses, a focus lens (group) FL for controlling focus, a zoom lens (group) ZL for controlling a zooming factor (a focal distance), and an iris I for controlling the quantity of light are provided in the taking lens 10 as movable optical components.

The lens controller 14 corresponds to, e.g., a drive unit to be attached to a lens barrel of the taking lens 10 in the case of a lens apparatus called an ENG lens. In the case of a lens apparatus called an EFP lens, the lens controller 14 corresponds to a constituent portion of a control system which is to be housed in a box case along with the taking lens 10. There may be a case where the lens controller 4 is separate from the taking lens.

The lens controller 14 is equipped with a motor FM coupled to the movable focus lens FL of the taking lens 10, a motor ZM coupled to the movable zoom lens ZL of the taking lens 10, a motor IM coupled to the movable iris I of the taking lens 10, a potentiometer FP coupled to the focus lens FL, a potentiometer ZP coupled to the zoom lens ZL, and a potentiometer IP coupled to the zoom lens ZL. The focus lens FL, the zoom lens ZL, and the iris I are electrically actuated by the motors FM, ZM, and IM. The lens controller 14 is provided with a CPU 18, and, e.g., the motor ZM coupled to the zoom lens ZL is controlled by the CPU 18. A drive signal having a value falling within a range is output from the CPU 18, and is input to an amplifier 22 after having been converted into an analog signal by means of an analog-to-digital converter 20. The amplifier 22 applies to the motor ZM a drive voltage corresponding to the voltage of the drive signal. Thereby, the motor ZM rotates at a speed (a direction and a speed; the same applies to any counterparts in the following descriptions) corresponding to the value of the drive signal output from the CPU 18. When the motor ZM is rotated, the zoom lens ZL coupled to the motor ZM is moved in the direction of the optical axis at a speed corresponding to the rotational speed of the motor ZM.

The potentiometer ZP coupled to the zoom lens ZL outputs a voltage signal whose value corresponds to the position of the zoom lens ZL, and the voltage signal is delivered to the CPU 18 by way of an analog-to-digital converter 24. Thereby, the CPU 18 ascertains the current position of the zoom lens ZL. For instance, when the position of the zoom lens ZL is controlled, or when the moving speed of the zoom lens ZL is controlled, the information is used for controlling deceleration of the zoom lens at the end of movement or a like action. The motor FM and the potentiometer FP, both coupled to the focus lens FL, and the motor IM and the potentiometer IP, both coupled to the iris I, are handled in the same manner as are the motor ZM and the potentiometer ZP, both coupled to the zoom lens ZL, and hence explanations of their operations are omitted.

In accordance with the control signal delivered from the zoom demand 16 or the like, the CPU 18 determines the value of the drive signal and outputs the drive signal of that value to the digital-to-analog converter 20, thereby controlling a motor (zoom lens).

The CPU 16 includes: a processing section including a non-linear processing portion 15 for performing a non-linear processing the control signal; and an invalidation portion 17 for invalidating the non-linear processing performed by the non-linear processing portion (i.e., a determination portion for determining whether to activate the non-linear processing portion).

The zoom demand 16 is a controller (i.e., an operating apparatus) which actuates the zoom lens ZL (the zoom lens ZL that is an object of control is simply called a "zoom") by means of electric power. The zoom demand is a controller used in controlling a zooming speed. The zoom demand is connected to the lens controller 14 by means of, e.g., a cable.

The zoom demand 16 is provided with an operating section 30 for operating the zoom demand. The operating section 30 is provided with an operating member, such as a thumb ring, to be used for specifying a target zooming speed. For instance, the operating member automatically returns to a reference position during a non-operation state, thereby allowing operation of the operating member in either a positive or negative direction with reference to the reference position of the operating member. In the following, the operating member of the operating section 30 is taken as a rotary member which is provided so as to be rotatable like a thumb ring.

A potentiometer 32 is coupled to the operating member, and a slider of the potentiometer 32 moves between end terminals "a" and "b" in synchronism with the operating member. Positive and negative voltages are supplied to the end terminals "a" and "b" of the potentiometer 32 from the lens controller 14. When the operating member is situated at the reference position for a non-operation state, the slider is located at a center between and remains in contact with the terminals. Further, the ground line grounded by the lens controller 14 is connected to the center position. A terminal "c" of the slider is connected to the CPU 18 by way of an analog-to-digital converter 26 of the lens controller 14. A voltage corresponding to the amount of operation of the operating member (a rotational angle from the reference position) is output from the terminal "c" of the slider as a control signal (a speed control signal) showing a target zooming speed. The value of the control signal is imparted to the CPU 18 of the lens controller 14.

The configuration of the illustrated operating section 30 of the zoom demand 16, the configuration by means of which the CPU 18 reads the control signal from the zoom demand 16, or the like are mere illustrations and the invention is not limited thereto. For instance, there may be employed a configuration for connecting the zoom demand 16 to the CPU 18 of the lens controller 14 by means of serial communication and transmitting the control signal from the zoom demand 16 to the CPU 18 through serial communication.

Figure 2:
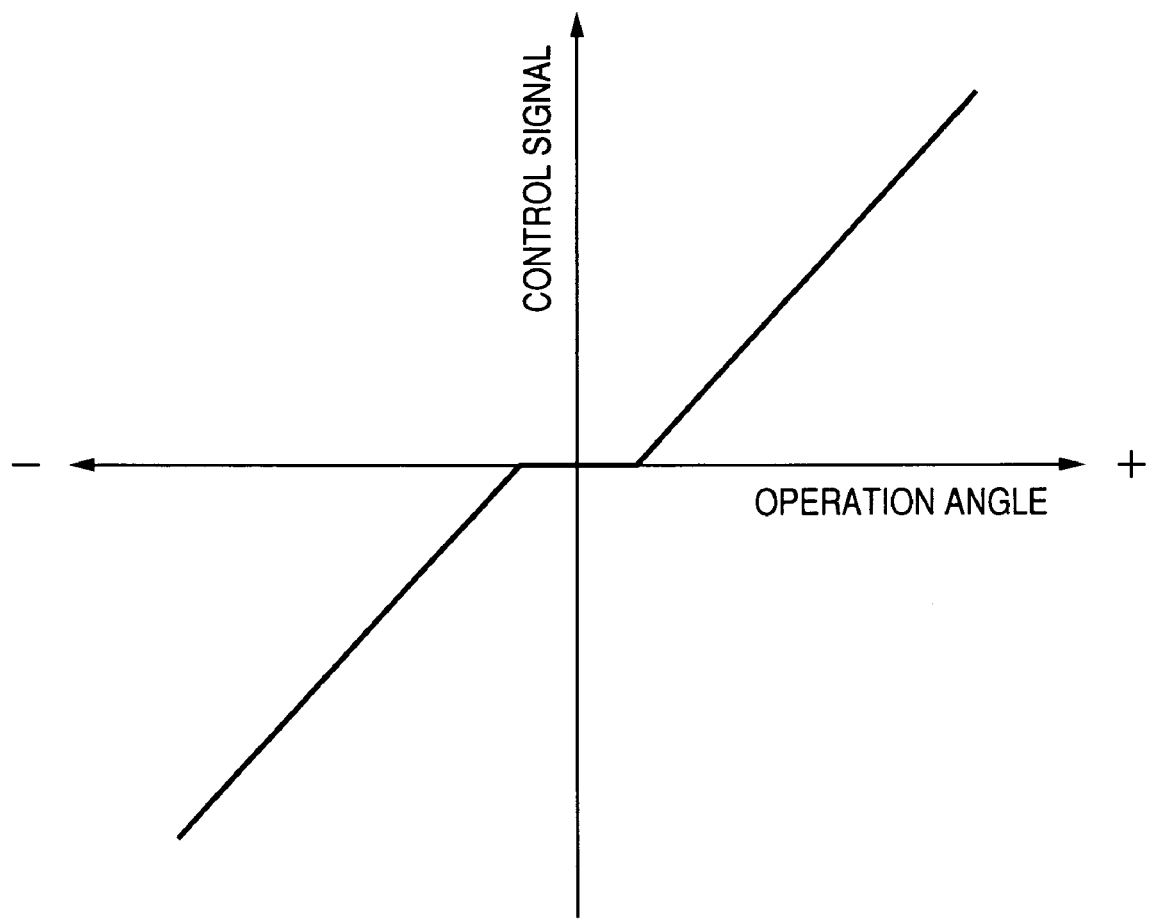
FIG. 2 is a view illustrating an output characteristic of a control signal output from a linear zoom demand.

Such a zoom demand 16 includes two types; namely, one having a linear characteristic and another having a non-linear characteristic. FIG. 2 is a view illustrating an output characteristic of the control signal generated when the zoom demand 16 has a linear characteristic. As illustrated, when the operating member of the operating section 30 is situated at the reference position (an operation angle of 0) for non-operation state, the control signal output from the zoom demand 16 is 0, thus indicating stoppage of the zooming action. Meanwhile, when the operating member of the operating section 30 is operated and when operation angle has reached a given level in a positive or negative direction, the value of the control signal is linearly increased (when operation is performed in a positive direction) or decreased (when operation is performed in a negative direction) with an increase in the operation angle. Specifically, as the operation angle becomes larger, the zooming speed (target speed) becomes linearly greater. Incidentally, there is provided a dead zone where no operation is considered to be performed when the control signal situated in the vicinity of an operation angle of 0 stays within the range of 0. The control signal whose value changes linearly with respect to operation of the operating section 30 is said to be a linear control signal.

Figure 3:
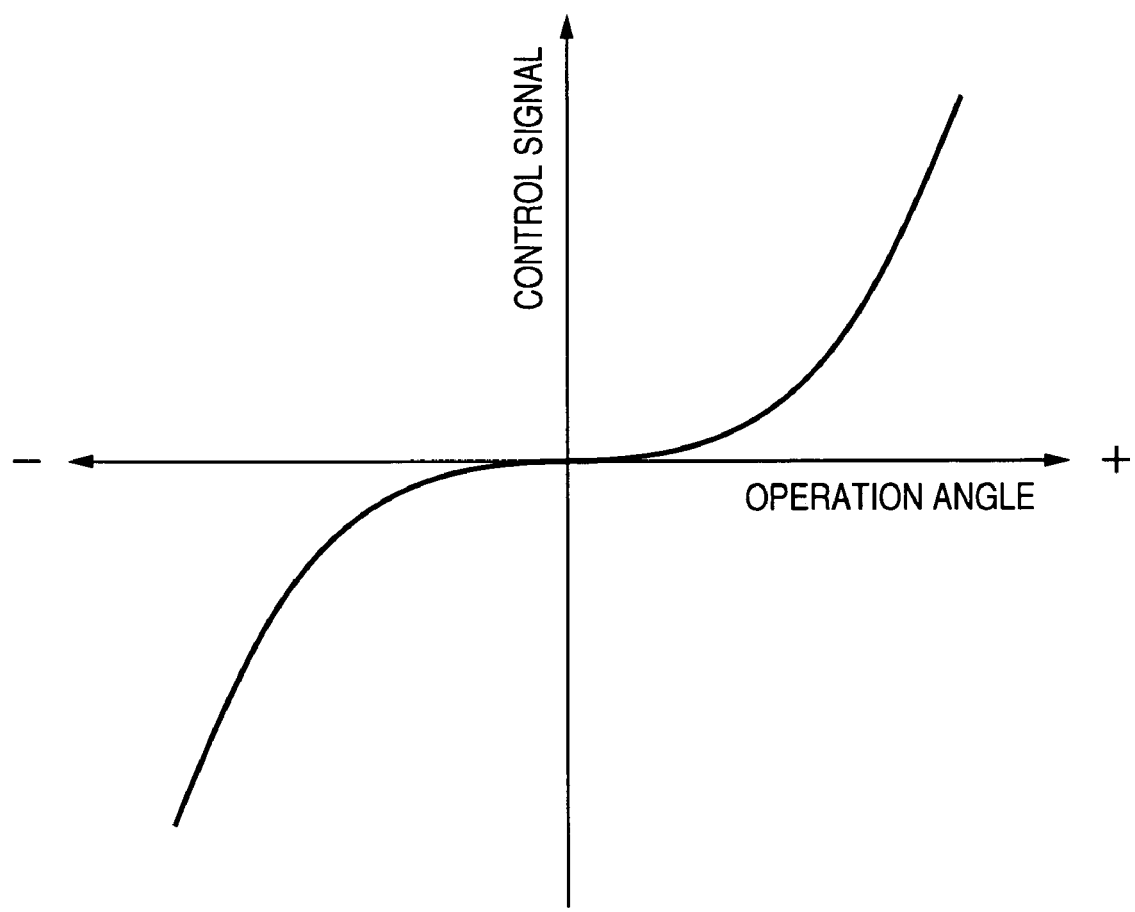
FIG. 3 is a view illustrating an output characteristic of a control signal output from a non-linear zoom demand.

FIG. 3 is a view illustrating an output characteristic of the control signal generated when the zoom demand 16 has a non-linear characteristic. As illustrated, when the operating member of the operating section 30 is situated at the reference position (an operation angle of 0) for non-operation state, the control signal output from the zoom demand 16 is 0, thus indicating stoppage of the zooming action. Meanwhile, when the operating member of the operating section 30 is operated, the value of the control signal is non-linearly increased (when operation is performed in a positive direction) or decreased (when operation is performed in a negative direction) with respect to an increase in the operation angle. At this time, when the operation angle is small and is increased, the rate of increase of the control signal with respect to the increase in operation angle is made larger. The control signal whose value changes non-linearly with respect to operation of the operating section 30 is said to be a non-linear control signal.

Figure 4:
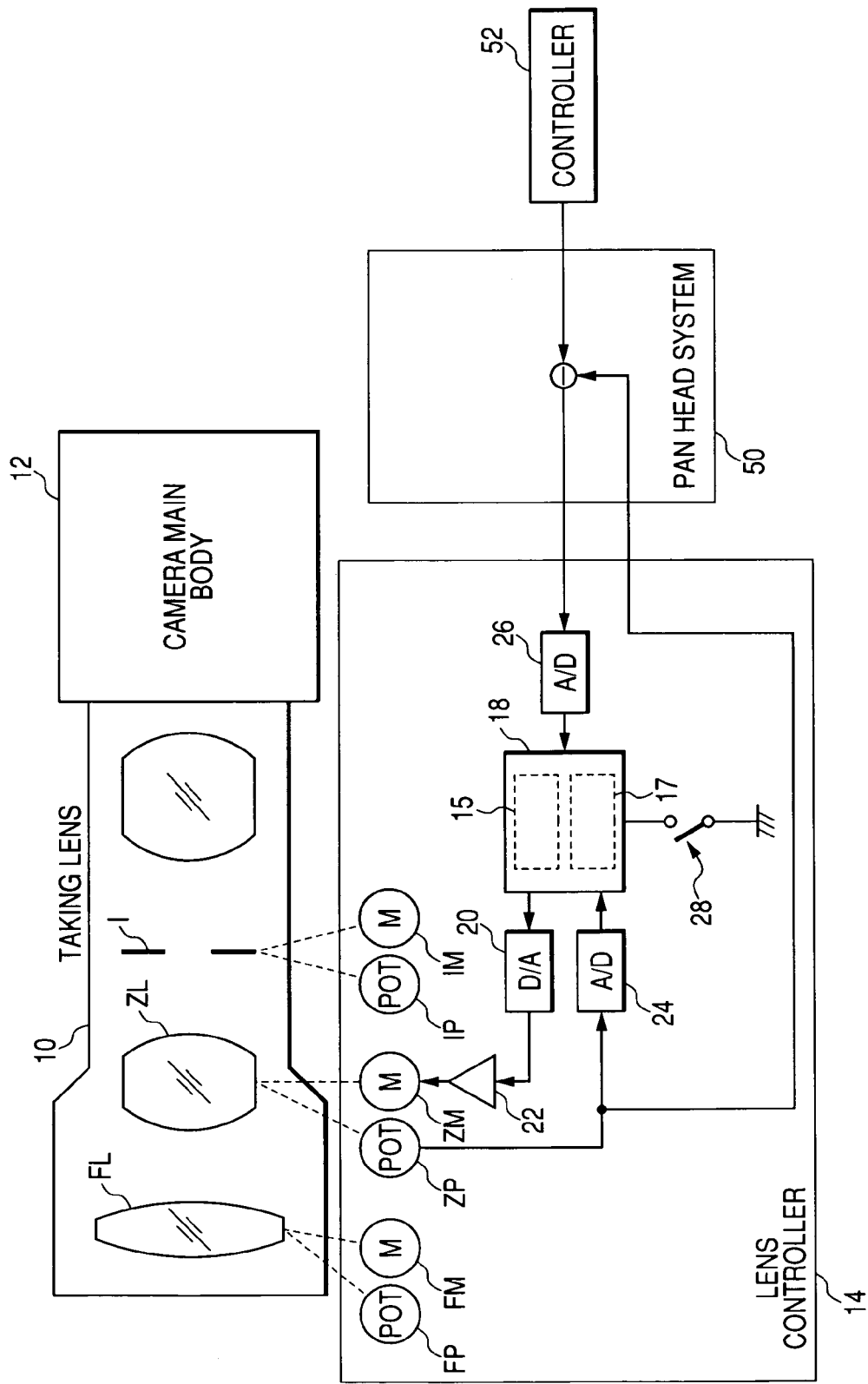
FIG. 4 is a view showing a case where a pan head system is connected in lieu of the zoom demand shown in FIG. 1.

Here, there is a case where a pan head system and a controller thereof other than the zoom demand 16 are connected as the operating apparatus to be connected to the lens controller 14. For instance, when the taking lens 10 and the camera main body 12 are placed on the pan head system to be remotely operated, as shown in FIG. 4, the lens controller 4 is connected, by way of the pan head system, to a controller 52 used by the pan head system 50. Individual constituent sections shown in FIG. 4 which are identical with or analogous in operation to those shown in FIG. 1 are assigned the same reference numerals as those shown in FIG. 1, and their repeated explanations are omitted. In the pan head system 50, the position controller 52 for controlling a zooming position is sometimes used. In this case, the controller 52 is provided with an operating member for specifying the target zooming position of the taking lens 10. The controller 52 put puts to the pan head system 50 a control signal (a position control signal) pertaining to a value (a target value) indicating the target zooming position in accordance with the position specified by the operating member. The pan head system 50 acquires a value (a current value) pertaining to the current zooming position from the potentiometer ZP of the lens controller 14, thereby determining a difference (or a value proportional to a difference) between the current value and the target value given by the controller 52. By way of the analog-to-digital converter 26, the control signal pertaining to that value is delivered to the CPU 18 of the lens controller 14 as a speed control signal. Thereby, the zoom lens ZL is actuated such that the current zoom value coincides with the target zoom value, whereupon the zoom lens ZL is moved to the position specified by the operating member of the controller 52.

When having acquired the control signal from the zoom demand 16 or the pan head system 50 as mentioned previously, the CPU 18 of the lens controller 14 determines the value of the drive signal on the basis of the control signal and outputs the drive signal of that value to the digital-to-analog converter 20, to thus control the motor ZM (the zoom lens ZL). At that time, the invalidation portion (the determination portion) 17 makes a determination as to whether or not the non-linear processing of the control signal is to be performed by the non-linear processing portion, on the basis of on/off of a switch 28. The switch 28 is a switch for selecting an activation or deactivation (on/off) of the non-linear processing of the control signal. In the illustration, the switch 28 is provided in the lens controller 14. However, the position is not limited to this position. The switch may be disposed at any position on the operating apparatus, such as the zoom demand 16 or the controller 52 of the pan head system 50.

Processing of the CPU 18 will be described by reference to a flowchart shown in FIG. 5. When powered on, the CPU 18 performs required initial setting operation (step S10) and then determines whether the switch 28 is on or off (activated or deactivated). Specifically, the invalidation portion 17 makes a determination as to whether the non-linear processing of the control signal is performed (step S12). When the non-linear processing is determined to be activated, non-linear processing is performed by the non-linear processing portion (step S14). In contrast, when the non-linear processing is determined to be deactivated, the non-linear processing is not performed.

Figure 6:
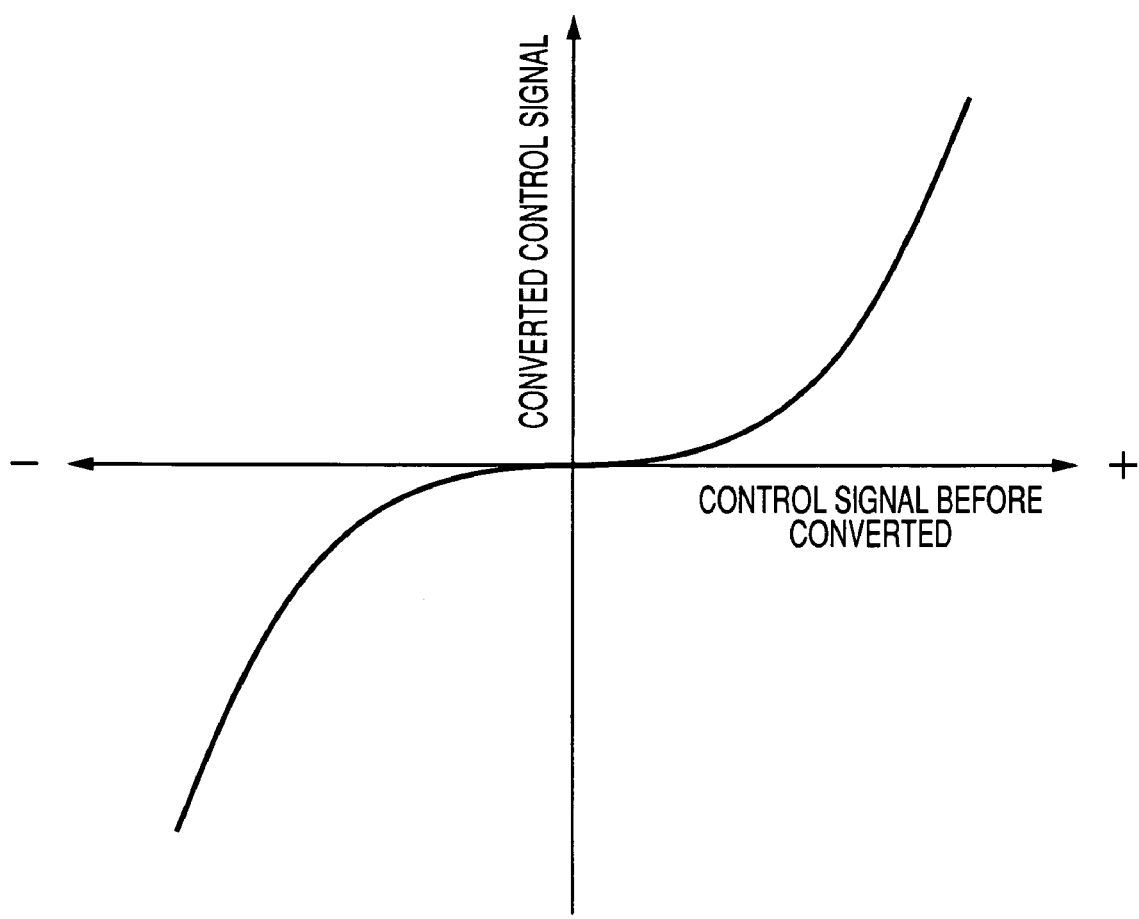
FIG. 6 is a view showing a relationship between a control signal before being converted through non-linear processing a control signal having been converted through non-linear processing.

The non-linear processing is processing for converting the control signal into anon-linear control signal, the control signal being given by the zoom demand 16 or the like. For instance, when a linear control signal, such as that shown in FIG. 2, is output from the zoom demand 16, the signal is converted into a non-linear control signal such as that shown in FIG. 3. Specifically, a relationship between a non-converted control signal that has not yet undergone non-linear processing and a converted control signal having undergone non-linear processing is shown in FIG. 6. With reference to such a relationship, the non-linear processing portion in the CPU 18 converts the value of the control signal given by the zoom demand 16 or the like.

Figure 5:
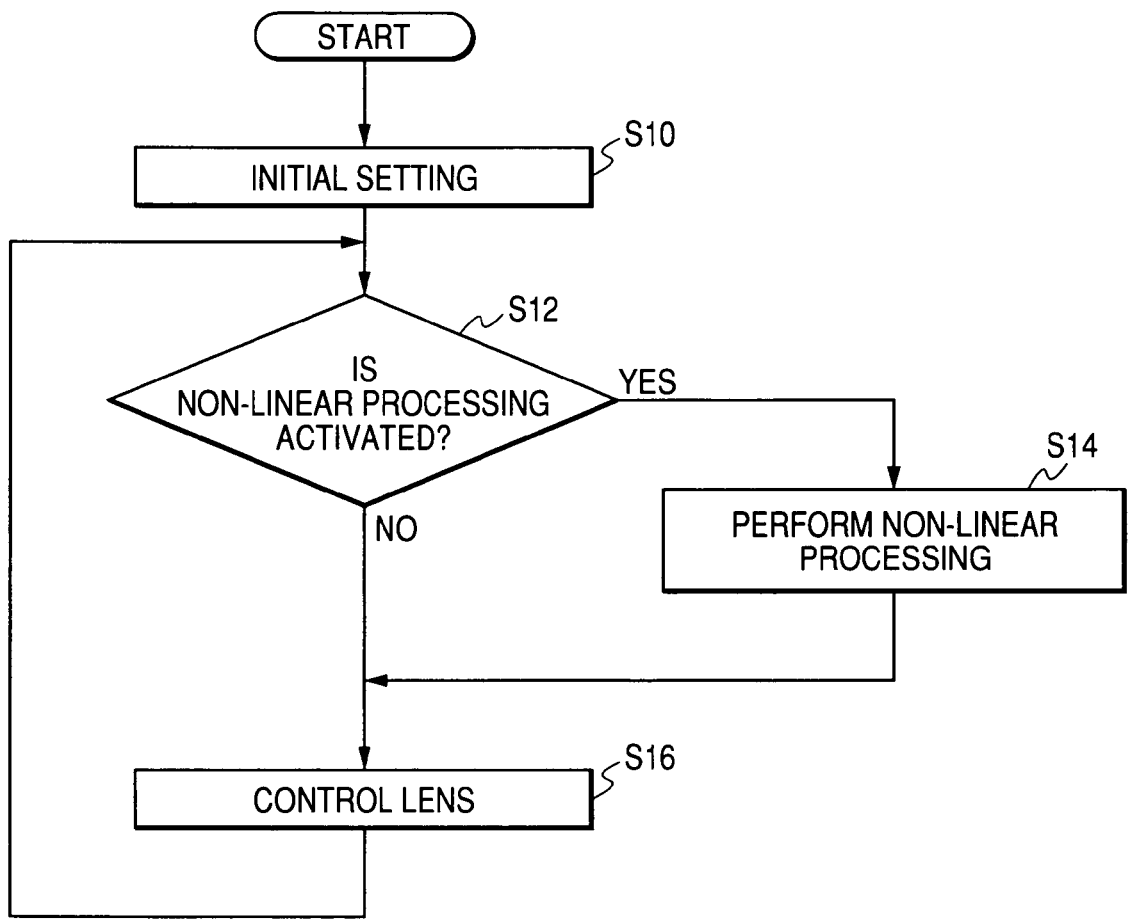
FIG. 5 is a flowchart showing procedures pertaining to activation/deactivation switching of non-linear processing to be performed by a CPU of a lens controller according to the first embodiment.

When the control signal has undergone non-linear processing, the CPU 18 outputs the converted control signal to the digital-to-analog converter 20 while taking the value of the control signal as the value of the drive signal during the lens control operation pertaining to step S16 in FIG. 5. As a result, the zoom lens ZL is non-linearly controlled in accordance with operation of the operating section 30 in the zoom demand 16 or the like.

When the control signal has not undergone non-linear processing, the CPU 18 outputs to the digital-to-analog converter 20 the value of the control signal given by the zoom demand 16 or the like, in unmodified form (or the value determined by multiplying the value of the control signal by a proportionality constant). Thereby, the zoom lens ZL is controlled by means of an output characteristic of the control signal output from the zoom demand 16 or the like.

The following is feasibly performed in response to non-linear processing being switched between valid and invalid. When the zoom demand 16 connected to the lens controller 14 has a linear characteristic, the non-linear processing activation/deactivation switch 28 is activated, to thereby cause the CPU 18 (the non-linear processing portion) to perform non-linear processing. As a result, when the zoom lens is moved at low speed, operation becomes preferably easy.

In contrast, in a situation where the zoom demand 16 connected to the lens controller 14 has a non-linear characteristic, when the non-linear processing activation/deactivation switch 28 is activated to cause the CPU 18 (the non-linear processing portion) to perform on-linear processing, non-linear processing is performed excessively, which in turn deteriorates operability. In such a case, when the non-linear processing activation/deactivation switch 28 is deactivated, the invalidation portion 17 make a determination to deactivate the non-linear processing of the control signal and the non-linear processing of the lens controller 14 (the non-linear processing by the non-linear processing portion) can be invalidated. Zoom can preferably be controlled by means of only the non-linear processing characteristic of the zoom demand 16.

Moreover, even in a case where the controller 52 for position control such as that shown in FIG. 4 is connected to the lens controller by way of the pan head system 50, when the non-linear processing activation/deactivation switch 28 is activated to cause the CPU 18 (the non-linear processing portion) to perform non-linear processing, the control signal employed for position control is improperly subjected to non-linear processing. Therefore, in such a case, when the non-linear processing activation/deactivation switch 28 is deactivated, the lens controller 14 does not perform non-linear processing. Hence, zoom can preferably be controlled by means of only the non-linear characteristic of the zoom demand 16.

As mentioned above, in the first embodiment, the non-linear processing to be performed by the lens controller 14 is switched between valid and invalid by means of the non-linear processing activation/deactivation switch 28. However, switching is not limited to this embodiment. For instance, in the operating apparatus connected to the lens controller 14, as in the case of the zoom demand 16, a linear control signal and a non-linear control signal are arranged so that the signals can be output in a switching manner. Which one of the two control signals is to be output may be determined by the operating apparatus or the non-linear processing activation/deactivation switch provided in the lens controller 14, as mentioned previously.

Figure 7:
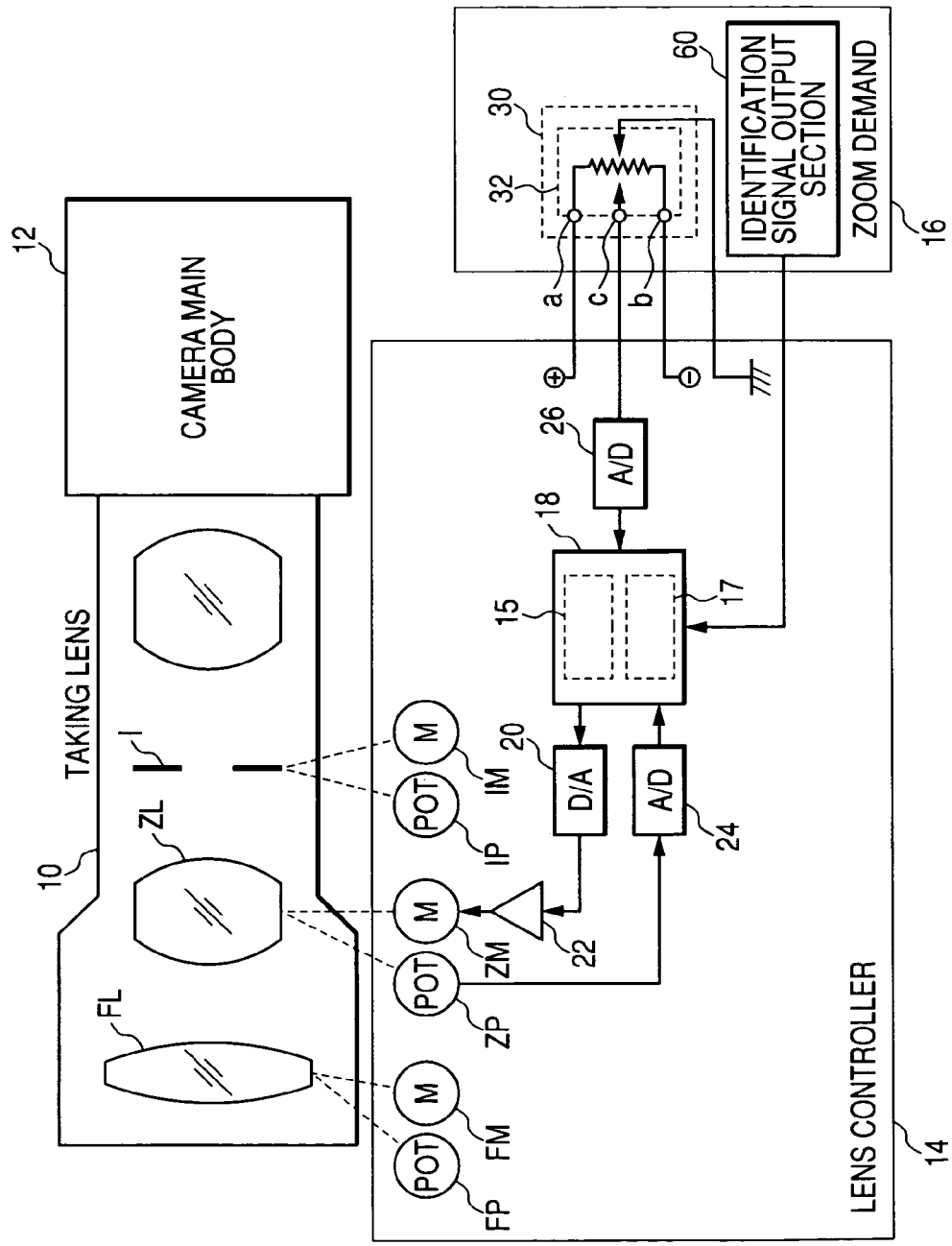
FIG. 7 is a block diagram showing a second embodiment of the configuration pertaining to zoom control of the lens control system to which the present invention is applied.

Next, a second embodiment in which the non-linear processing to be performed by the CPU 18 (the non-linear processing portion) of the lens controller 14 is appropriately switched between valid and invalid will be described by reference to a block diagram shown in FIG. 7. Individual constituent sections shown in FIG. 7 which are identical with or analogous in operation to those shown in FIG. 1 are assigned the same reference numerals as those shown in FIG. 1, and their repeated explanations are omitted. In FIG. 7, an identification signal output section 60 which outputs an identification signal indicating whether the characteristic of the signal is non-linear or linear (i.e., an identification signal indicating whether an output control signal is non-linear or linear) to the zoom demand 16 is provided in lieu of the non-linear processing activation/deactivation switch 28 shown in FIG. 1. The identification signal output section 60 outputs, to the CPU 18, a high-level identification signal when the control signal is non-linear and a low-level identification signal when the control signal is linear.

Figure 8:
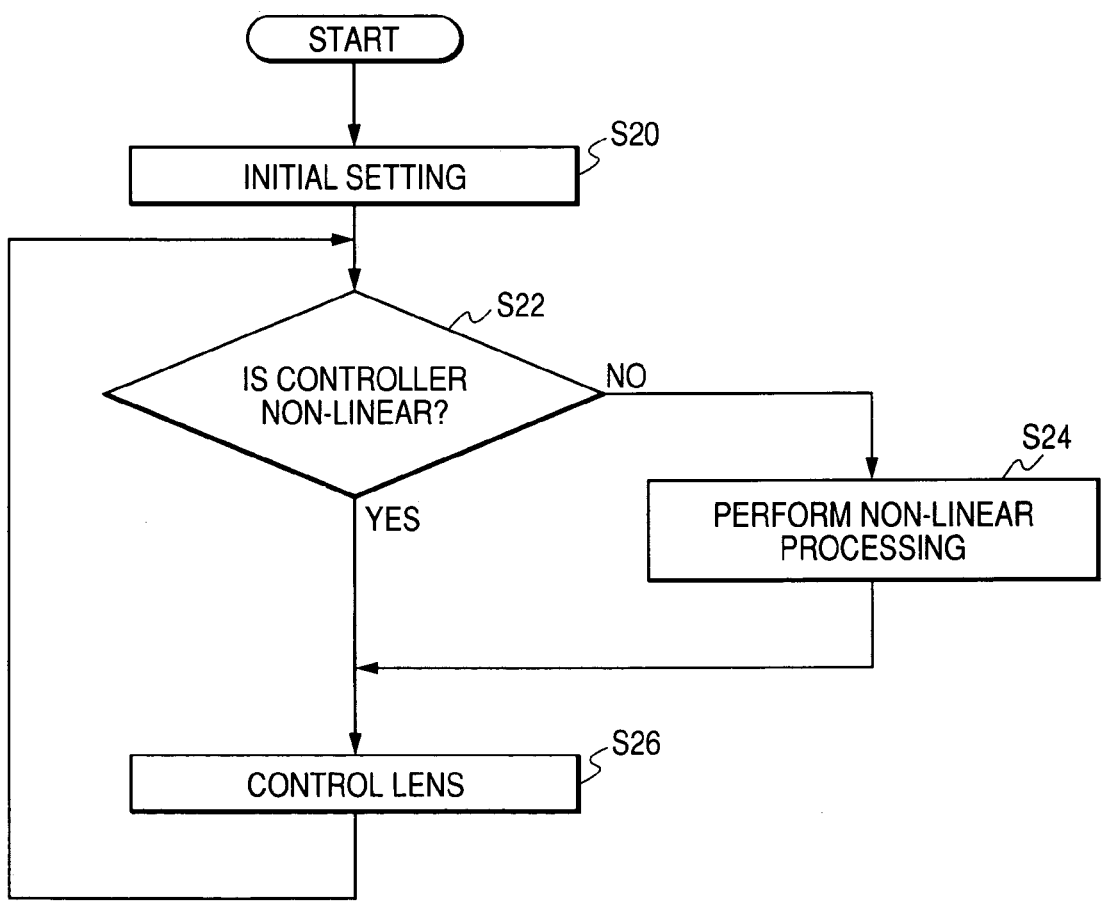
FIG. 8 is a flowchart showing procedures pertaining to activation/deactivation switching of linear processing to be performed by the CPU of the lens controller according to the second embodiment.

FIG. 8 is a flowchart showing procedures pertaining to activation/deactivation switching of non-linear processing in the CPU 18 of the lens controller 14. When powered on, the CPU 18 performs required initial setting operations (step S20), reads an identification signal output from the identification signal output section 60 of the zoom demand 16, and the invalidation portion (the determination portion) 17 determines whether or not the zoom demand 16 is a non-linear controller (i.e., whether or not the zoom demand 16 outputs a linear control signal or a non-linear control signal) (step S32). When the result of the determination is NO (i.e., the zoom demand 16 outputs a linear control signal), the non-linear processing is made effective and the non-linear processing portion in the CPU 18 performs the non-linear processing in response to the control signal given by the zoom demand 16 (step S24). In contrast, when the result of determination is YES (i.e., the zoom demand 16 outputs a non-linear control signal), the non-linear processing is not performed.

When the non-linear processing is performed, during the lens control pertaining to step S26 the CPU 18 outputs to the digital-to-analog converter 20 the value of the control signal determined through the non-linear processing as the value of the drive signal. As a result, the zoom lens ZL is non-linearly controlled in accordance with operation of the operating section 30 of the zoom demand 16.

When the non-linear processing is not performed, the CPU 18 outputs to the digital-to-analog converter 20 the value of the control signal given by the zoom demand 16, in unmodified form (the value determined by multiplying the value of the control signal by a proportionality constant). Thereby, the zoom lens ZL is controlled by the output characteristic of the control signal.

As mentioned above, the identification signal indicating whether the characteristic of the operating apparatus, such as the zoom demand 16, is linear or non-linear is output, whereby the CPU 18 of the lens controller 14 can automatically, appropriately switch activation/deactivation of non-linear processing.

In the second embodiment, the non-linear processing of the lens controller 14 is switched to valid or invalid in accordance with the identification signal given by the zoom demand 16. Conversely, for instance, in the operating apparatus connected to the lens controller 14, as in the case of the zoom demand 16, a linear control signal and a non-linear control signal can be output in a switching manner. Further, an identification signal indicating whether the characteristic of the lens controller 14 is linear or non-linear (whether or not the non-linear processing is performed) is output to the operating apparatus from the lens controller 14. As a result, on the basis of the identification signal, the scheme of the control signal output from the operating apparatus to the lens controller 14 can be switched to the scheme of a signal having an appropriate characteristic.

Figure 9:
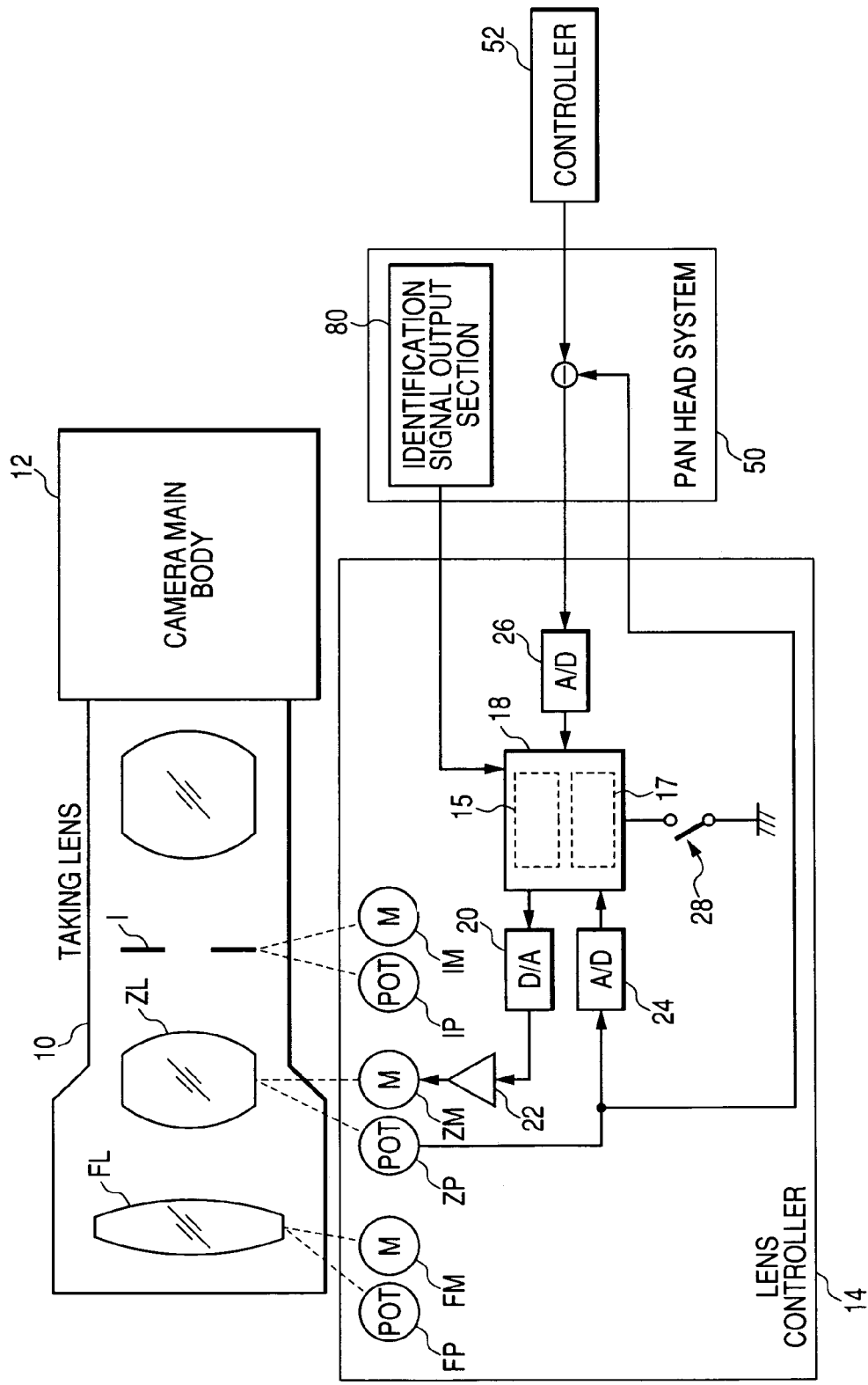
FIG. 9 is a block diagram showing a third embodiment of the configuration pertaining to zoom control of the lens control system to which the present invention is applied.

Next, a third embodiment—in which the non-linear processing to be performed by the CPU 18 of the lens controller 14 can be switched between valid and invalid—is shown in the block diagram of FIG. 9. Individual constituent sections shown in FIG. 9 which are identical with or analogous in operation to those shown in FIG. 4 are assigned the same reference numerals as those shown in FIG. 4, and their repeated explanations are omitted. FIG. 9 shows a case where the pan head system 50 is connected as an operating apparatus to the lens controller 14. In place of the non-linear processing activation/deactivation switch 28 shown in FIG. 4, the pan head system 50 is provided with an identification signal output section 80 for outputting an identification signal indicating whether zooming position control or speed control is to be performed (i.e., whether the control signal output from the zoom demand 16 indicates a target speed control or target position of the zoom lens). The identification signal output section 80 outputs, to the CPU 18, a high-level identification signal when position control is to be performed and a low-level identification signal when speed control is to be performed. Incidentally, the identification signal output section 80 may also be provided in the controller 52.

Figure 10:
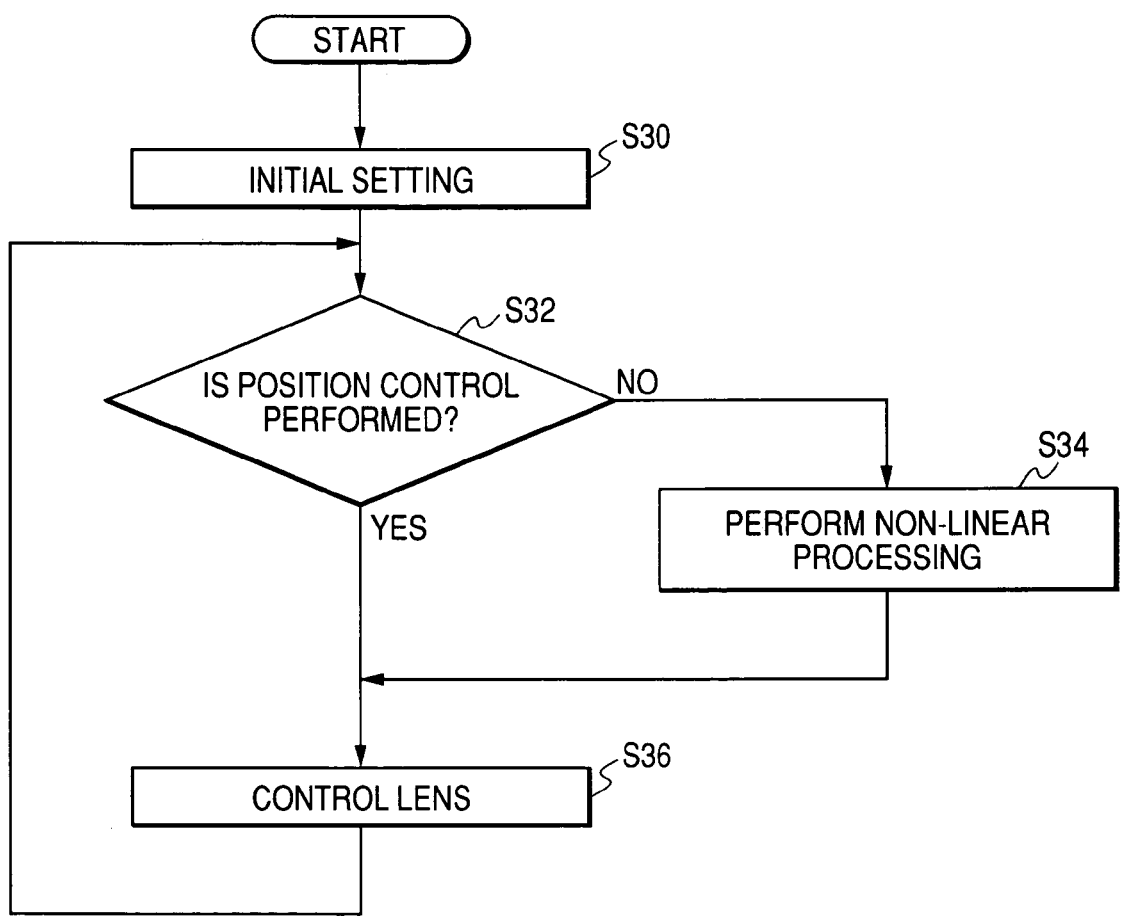
FIG. 10 is a flowchart showing procedures pertaining to activation/deactivation switching of linear processing to be performed by the CPU of the lens controller according to the third embodiment.

FIG. 10 a flowchart showing procedures pertaining to activation/deactivation switching of non-linear processing in the CPU 18 of the lens controller 14. When powered on, the CPU 18 performs required initial setting operations (step S30), reads an identification signal output from the identification signal output section 80 of the pan head system 50, and the invalidation portion (the determination portion) 17 determines whether or not the pan head system 50 is to perform position control (i.e., whether or not the pan head system 50 outputs the control signal indicating the target position of the zoom lens) (step S32). When the result of determination is NO, the non-linear processing is made effective and the non-linear processing portion in the CPU 18 performs the non-linear processing in response to the control signal given by the zoom demand 16 (step S34). In contrast, when the result of determination is YES, non-linear processing is not performed.

When non-linear processing is performed, during the lens control pertaining to step S36 the CPU 18 outputs to the digital-to-analog converter 20 the value of the control signal determined through non-linear processing as the value of the drive signal. In contrast, when non-linear processing is not performed, the CPU 18 outputs to the digital-to-analog converter 20 the value of the control signal given by the pan head system 50, in unmodified form (the value determined by multiplying the value of the control signal by a proportional constant).

As mentioned above, the pan head system 50 is caused to output an identification signal indicating whether position control or speed control is to be performed, whereby the CPU 18 of the lens controller 14 can automatically, appropriately switch between activation/deactivation of non-linear processing.

Figure 11:
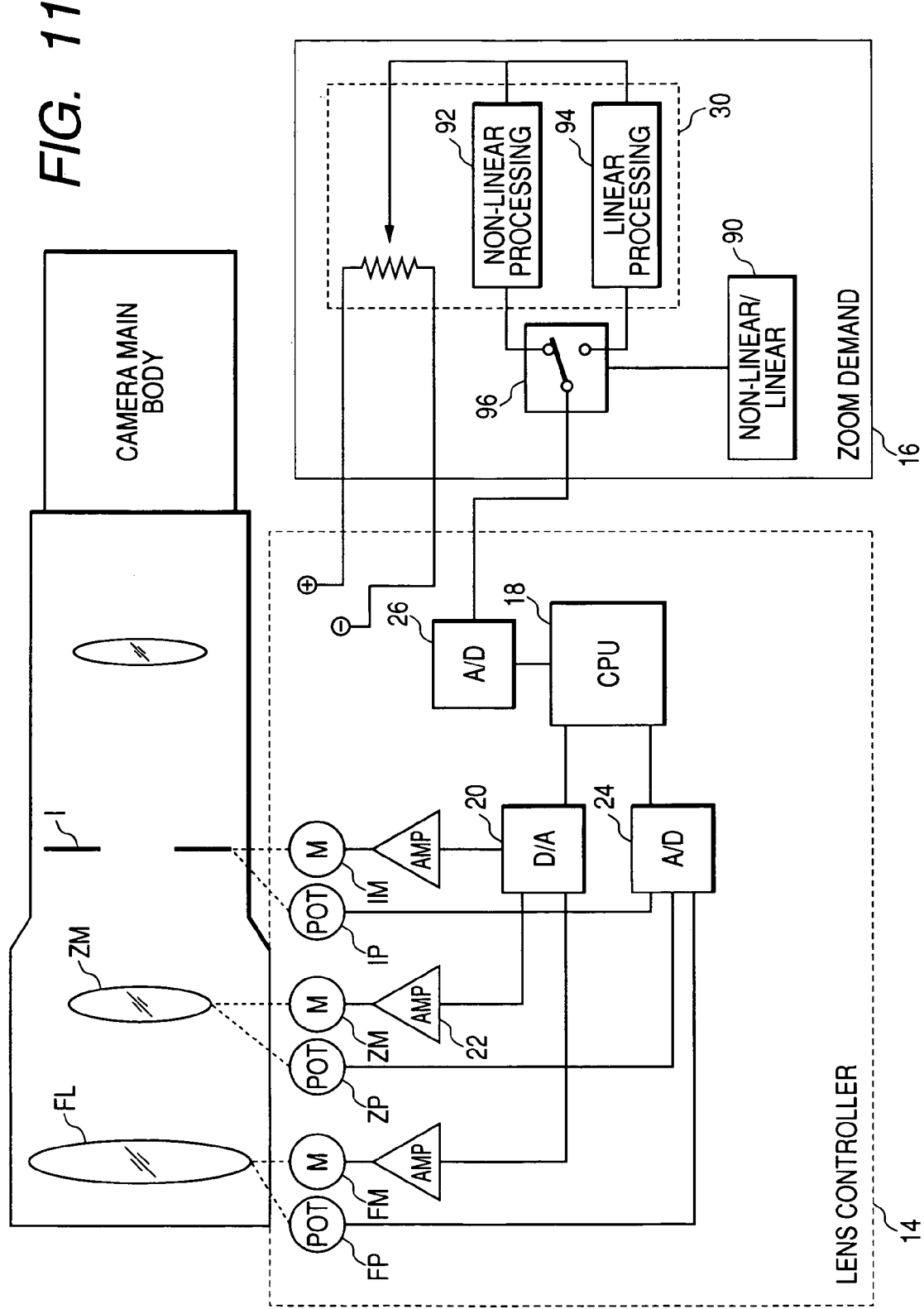
FIG. 11 is a block diagram showing a fourth embodiment of the configuration pertaining to zoom control of the lens control system to which the present invention is applied.

Next, a fourth embodiment in which one of the linear and non-linear control signal to be output is determined by the operating apparatus will be described by reference to a block diagram shown in FIG. 11. Individual constituent sections shown in FIG. 11 which are identical with or analogous in operation to those shown in FIG. 1 are assigned the same reference numerals as those shown in FIG. 1, and their repeated explanations are omitted.

In this embodiment, the zoom demand 16 includes a control signal output section 96 that switches (selects) a control signal output between a linear control signal output and a non-linear control signal and outputs the selected linear or non-linear control signal. The linear control signal and the non-linear control signal are output from a linear control signal output potion 94 and a non-linear control signal output portion in an operating section 30, respectively. The zoom demand 16 further includes a switch 90 for selecting the linear control portion or the non-linear control portion. The control signal output section 96 switches the control signal to be output according to the selection (selection "linear" or selection "non-linear") of the switch 90.

When the lens controller 14 performs the non-linear processing of the control signal received from the zoom demand 16, the selection "linear" is selected by means of the switch 90, and according to this selection of the switch 90, the control signal output section 96 selects the linear control signal output and outputs the linear control signal to the lens controller.

Meanwhile, when the lens controller 14 performs the linear processing of the control signal received from the zoom demand 16 (i.e., the non-linear processing is deactivated), the selection "non-linear" is selected by means of the switch 90, and according to this selection of the switch 90, the control signal output section 96 selects the non-linear control signal output and outputs the non-linear control signal to the lens controller.

According to this embodiment, the control signal output from the operating apparatus can be switched between a linear control signal and a non-linear control signal. Hence, excessive non-linear processing can be prevented.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The present application claims foreign priority based on Japanese Patent Application No. JP2004-107178, filed Mar. 31 of 2004, the contents of which is incorporated herein by reference.

What is claimed is:

1. A lens control system comprising:
an operating apparatus that outputs a control signal on the basis of operation of an operating section, the control signal indicating one of a target moving speed of a movable lens group in a taking lens and a target position of the movable lens group; and
a lens controller, the lens controller including a non-linear processing unit that performs a non-linear processing of the control signal and a determination unit that determines whether to activate the non-linear processing unit, wherein the lens controller is configured to control a moving speed of the movable lens group on the basis of the control signal, and is further configured to provide for non-linear control of the lens group in response to the control signal when the control signal is non-linear irrespective of the non-linear processing unit being activated.

2. The lens control system according to claim 1, which comprises a first switch for selecting one of an activation of the non-linear processing and a deactivation of the non-linear processing, wherein when the deactivation of the non-linear processing is selected by the first switch, the determination unit determines to deactivate the non-linear processing unit.

3. The lens control system according to claim 2, wherein the lens controller further comprises the first switch.

4. The lens control system according to claim 1 comprising:
an identification signal output unit that outputs an identification signal to the operating apparatus, wherein the identification signal indicates that the lens controller performs the non-linear processing of the control signal, and the operating apparatus outputs the control signal to the lens controller, the control signal indicating one of a target moving speed of a movable lens group in a taking lens and a target position of the movable lens group on the basis of operation of an operating section in the operating apparatus.

5. The lens controller of claim 4 further comprising at least one of:
a first switch for selecting one of an activation of the non-linear processing and a deactivation of the non-linear processing; and
a second switch for selecting whether the control signal is one of a linear control signal and a non-linear control signal.

6. The lens control system according to claim 1, wherein the operating section includes:
a first identification signal output unit that outputs a first identification signal indicating whether a control signal is a linear control signal or a non-linear control signal, the control signal indicating one of a target moving speed of a movable lens group in a taking lens and a target position of the movable lens group on the basis of operation of an operating section;
a second identification signal output unit that outputs a second identification signal indicating whether the control signal indicates the target moving speed or the target position; and
a control signal output unit that outputs the control signal.

7. The lens control system of claim 6, wherein the operating section further includes:
a first switch for selecting one of an activation of the non-linear processing and a deactivation of the non-linear processing; and
a second switch for selecting whether the control signal is one of a linear control signal and a non-linear control signal.

8. A lens control system comprising:
an operating apparatus that outputs a control signal on the basis of operation of an operating section, the control signal indicating one of a target moving speed of a movable lens group in a taking lens and a target position of the movable lens group; and
a lens controller that controls a moving speed of the movable lens group on the basis of the control signal, the lens controller comprising: a non-linear processing unit that performs a non-linear processing of the control signal; and a determination unit that determines whether to activate the non-linear processing unit, wherein when the control signal is a non-linear control signal with respect to operation of the operating section, the determination unit determines to deactivate the non-linear processing unit.

9. The lens control system according to claim 8, the operating apparatus further comprises a first identification signal output unit that outputs a first identification signal indicating whether the control signal is a linear control signal or a non-linear control signal.

10. A lens control system comprising:
an operating apparatus that outputs a control signal on the basis of operation of an operating section, the control signal indicating one of a target moving speed of a movable lens group in a taking lens and a target position of the movable lens group; and
a lens controller that controls a moving speed of the movable lens group on the basis of the control signal, the lens controller comprising: a non-linear processing unit that performs a non-linear processing of the control signal; and
a determination unit that determines whether to activate the non-linear processing unit, wherein when the control signal indicates the target position of the movable lens group, the determination unit determines that the non-linear processing unit does not perform the non-linear processing of the control signal.

11. The lens control system according to claim 10, the operating apparatus further comprises a second identification signal output unit that outputs a second identification signal indicating whether the control signal indicates the target moving speed or the target position.

* * * * *